United States Patent
Mai

(10) Patent No.: US 7,460,195 B2
(45) Date of Patent: Dec. 2, 2008

(54) LIQUID CRYSTAL MODULE WITH LIGHT GUIDE PLATE HAVING TFT ARRAY THEREON

(75) Inventor: Che-Kuei Mai, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 300 days.

(21) Appl. No.: 11/541,220

(22) Filed: Sep. 29, 2006

(65) Prior Publication Data

US 2007/0076140 A1    Apr. 5, 2007

(30) Foreign Application Priority Data

Sep. 30, 2005    (TW) ............................... 94134296 A

(51) Int. Cl.
*G02F 1/1335* (2006.01)

(52) U.S. Cl. ........................................ 349/61

(58) Field of Classification Search ............... 349/12, 349/57, 58, 61, 65, 96, 113, 117
See application file for complete search history.

(56) References Cited

U.S. PATENT DOCUMENTS 6,133,979 A    10/2000    Komatsu et al.

| | | | |
|---|---|---|---|
| 2001/0028422 A1* | 10/2001 | Tsujimura et al. | 349/96 |
| 2002/0008805 A1* | 1/2002 | Kawakami et al. | 349/61 |
| 2002/0071087 A1* | 6/2002 | Suzuki et al. | 349/155 |
| 2002/0109812 A1* | 8/2002 | Takami et al. | 349/113 |
| 2004/0079891 A1* | 4/2004 | Sato et al. | 250/370.12 |
| 2005/0007513 A1* | 1/2005 | Lee et al. | 349/57 |

* cited by examiner

*Primary Examiner*—Quyen P Leung
(74) *Attorney, Agent, or Firm*—Wei Te Chung

(57) ABSTRACT

An exemplary liquid crystal module (2) includes a transparent substrate (222) having a color filter, a light guide plate (221) opposite to the transparent substrate, and a liquid crystal layer (223) sandwiched between the transparent substrate and the light guide plate. The light guide plate has a thin film transistor (TFT) array formed thereat. The liquid crystal module includes the light guide plate having the TFT array formed thereon, instead of conventionally including a separate TFT array substrate in addition to a light guide plate. This configuration of the light guide plate decreases an overall thickness and weight of the liquid crystal module compared with a conventional liquid crystal module. Moreover, the process of assembly of the liquid crystal module is simplified.

17 Claims, 7 Drawing Sheets

LIQUID CRYSTAL MODULE WITH LIGHT GUIDE PLATE HAVING TFT ARRAY THEREON

FIELD OF THE INVENTION

The present invention relates to liquid crystal modules, and particularly to a liquid crystal module with a light guide plate having a thin film transistor (TFT) array thereon.

GENERAL BACKGROUND

A typical liquid crystal display (LCD) is capable of displaying a clear and sharp image through millions of pixels that make up the complete image. The liquid crystal display has thus been applied to various electronic equipment in which messages or pictures need to be displayed, such as mobile phones and notebook computers. One form of a common type of liquid crystal display is known as a liquid crystal module.

Referring to FIG. 11, a typical liquid crystal module 1 includes a backlight module 10, a liquid crystal panel 15, and a drive integrated circuit (IC) 16. The backlight module 10 is disposed adjacent to the liquid crystal panel 15, and is configured to illuminate the liquid crystal panel 15. The drive IC 16 is fixed and electrically connected to the liquid crystal panel 15 by an anisotropic conductive film (ACF).

Referring also to FIG. 12, the backlight module 10 includes three light sources 101, a light guide plate (LGP) 102, a reflective plate 103, a prism plate 104, and a diffusing plate 105. The reflective plate 103, the light guide plate 102, the diffusing plate 105, and the prism plate 104 are disposed one on the other in that order from bottom to top. The light sources 101 are disposed adjacent to a low-profile side surface (not labeled) of the light guide plate 102.

Light beams from the light sources 101 enter the light guide plate 102 through the side surface. A portion of the light beams is reflected and scattered in the light guide plate 102, and then emits from a top surface of the light guide plate 102 toward the diffusing plate 105. Another portion of the light beams emits from a bottom surface of the light guide plate 102, and is then reflected back into the light guide plate 102 by the reflective plate 103. These light beams subsequently also emit from the top surface of the light guide plate 102 toward the diffusing plate 105. By passing through the diffusing plate 105 and the prism plate 104 in turn, all the light beams are converted such that they cooperatively provide a uniform plane light source for illuminating the liquid crystal panel 15.

Referring also to FIG. 13, the liquid crystal panel 15 includes a first substrate 151 and a second substrate 152 opposite to the first substrate 151. Each of the two substrates 151, 152 has an alignment layer 154 formed on an inner surface thereof. A liquid crystal layer 153 is sandwiched between the two alignment layers 154. Two polarizers 155, 156 are respectively disposed on outer surfaces of the two substrates 151, 152. Polarizing axes of the two polarizers 155, 156 are perpendicular to each other.

The need to have a separate backlight module 10 attached to the liquid crystal panel 15 can make the liquid crystal module 1 unduly thick and heavy for certain applications. Therefore, a new liquid crystal module that can overcome the above-described problems is desired.

SUMMARY

In a preferred embodiment, a liquid crystal module includes a transparent substrate having a color filter, a light guide plate opposite to the transparent substrate, and a liquid crystal layer sandwiched between the transparent substrate and the light guide plate. The light guide plate has a thin film transistor (TFT) array formed thereat.

Other advantages and novel features will become more apparent from the following detailed description when taken in conjunction with the accompanying drawings. In the drawings, all the views are schematic.

DETAILED DESCRIPTION OF PREFERRED EMBODIMENTS

Figure 1:
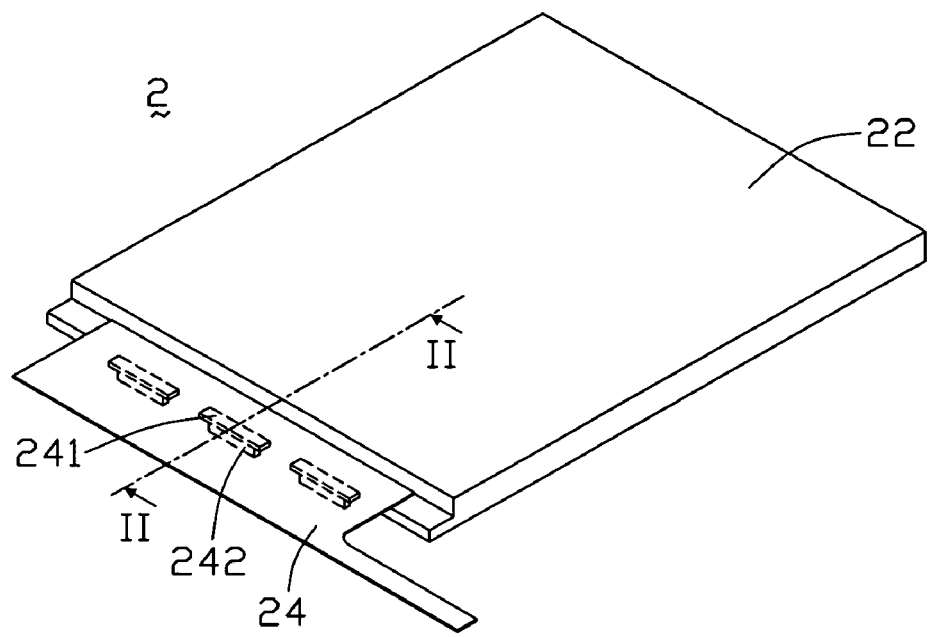
FIG. 1 is an isometric view of a liquid crystal module according to a first embodiment of the present invention, the liquid crystal module including a light guide plate.

Referring to FIG. 1, a liquid crystal module 2 according to a first embodiment of the present invention includes a liquid crystal panel 22 and a flexible printed circuit (FPC) 24. An output end of the FPC 24 is electrically connected to a data region (not labeled) of the liquid crystal panel 22 by welding or by an anisotropic conductive film (ACF). The FPC 24 has three backlight drive integrated circuits (ICs) 241 electrically connected thereto by chip on film (COF) technology. Each backlight drive IC 241 corresponds to a respective adjacent light emitting diode (LED) 242, and drives that LED 242.

Figure 2:
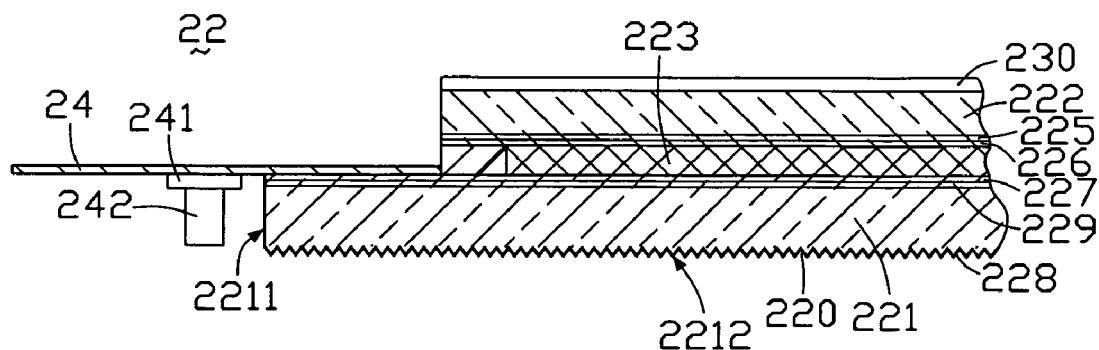
FIG. 2 is an enlarged, cross-sectional view of part of the liquid crystal module of FIG. 1, taken along line II-II thereof.

Referring also to FIG. 2, the liquid crystal panel 22 includes a light guide plate 221 having a thin film transistor (TFT) array (not shown) formed thereon, a glass substrate 222 having a color filter, and a liquid crystal layer 223 sandwiched between the light guide plate 221 and the glass substrate 222.

The glass substrate 222 has a common electrode 225 and an upper alignment layer 226, which are formed on an inner surface (not labeled) of the glass substrate 222 in that order. The glass substrate 222 also has an upper polarizer 230 attached on an outer surface (not labeled) thereof. The light guide plate 221 includes a light incident surface 2211, an inner surface (not labeled) nearest to the liquid crystal layer 223, and an outer surface 2212 opposite to the inner surface. The light guide plate 221 has the array of TFTs (not shown), pixel electrodes (not shown), data lines (not shown), and gate lines (not shown) formed on the inner surface thereof. The TFT array can be fabricated by performing the following steps: forming a gate pattern on the light guide plate 221 by a first photo-mask process; coating a semiconductor layer on the light guide plate 221 having the gate pattern by a plasma enhanced chemical vapor deposition (PECVD) process; forming a semiconductor pattern by a second photo-mask process; forming pixel electrodes by a third photo-mask process; forming source/drain electrodes by a fourth photo-mask process; etching the semiconductor pattern by a reactive ion etch (RIE) process; forming a passivation layer by a PECVD process; and etching the passivation layer by a fifth photo-mask process.

The light guide plate 221 further has a lower polarizer 229 and a lower alignment layer 227 formed in that order on the TFTs, the pixel electrodes, the data lines and the gate lines. The outer surface 2212 defines a continuous jagged structure 220. A reflective film 228 is coated on the jagged structure 220. The light guide plate 221 may be made from glass or resin which has high light transmittance and resistance to chemical degradation, and which is fire resistant. An alignment direction of the upper alignment layer 226 and an alignment direction of the lower alignment layer 227 define an angle therebetween. The FPC 24 is attached on an edge portion of the inner surface of the light guide plate 221 having the lower polarizer 229 and the lower alignment layer 227 thereon. The LEDs 242 of the FPC 24 face the incident surface 2211 of the light guide plate 221.

Figure 3:
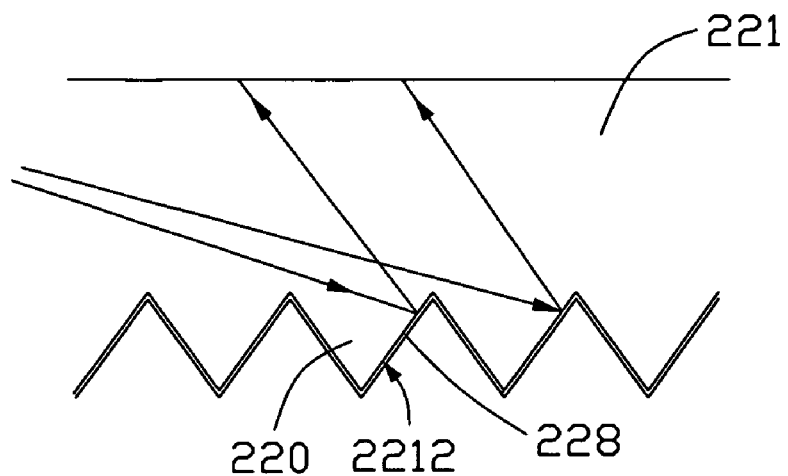
FIG. 3 is an enlarged, side view of part of the light guide plate seen in FIG. 2, showing essential light paths therein.

Referring also to FIG. 3, the jagged structure 220 can efficiently redirect light beams that reach the outer surface 2212, toward the inner surface of the light guide plate 221 and thus toward the liquid crystal layer 223. The reflective film 228 can redirect light beams leaking from the outer surface 2212 back into the light guide plate 221.

In operation, light beams emitted from the LEDs 242 enter the light guide plate 221 through the incident surface 2211. A portion of the light beams emit from the inner surface of the light guide plate 221 without ever reaching the outer surface 2212, and travel toward the liquid crystal layer 223. Another portion of the light beams are reflected by the jagged structure 220 and/or the reflective film 228, and then emit from the inner surface of the light guide plate 221 and travel toward the liquid crystal layer 223.

In summary, the liquid crystal module 2 includes the light guide plate 221 having the TFT array formed thereon, instead of conventionally including a separate TFT array substrate in addition to a light guide plate. This configuration of the light guide plate 221 decreases an overall thickness and weight of the liquid crystal module 2 compared with a conventional liquid crystal module. Moreover, the process of assembly of the liquid crystal module 2 is simplified.

Figure 4:
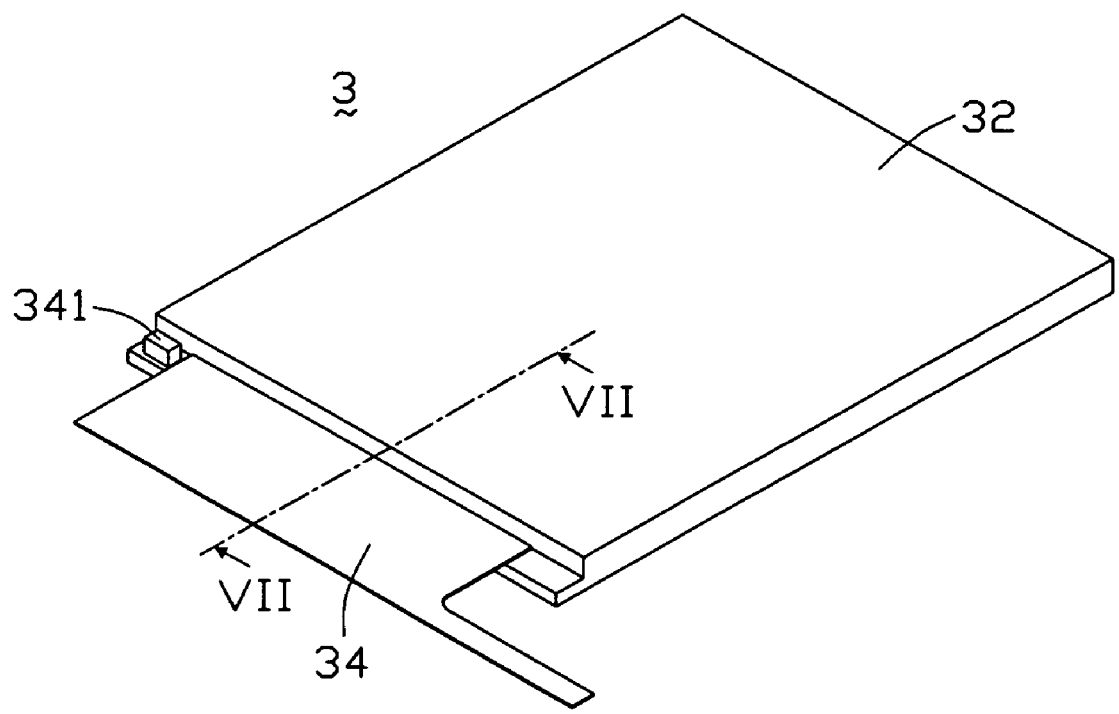
FIG. 4 is an isometric view of a liquid crystal module according to a second embodiment of the present invention, the liquid crystal module including a liquid crystal panel and a flexible printed circuit (FPC).
Figure 5:
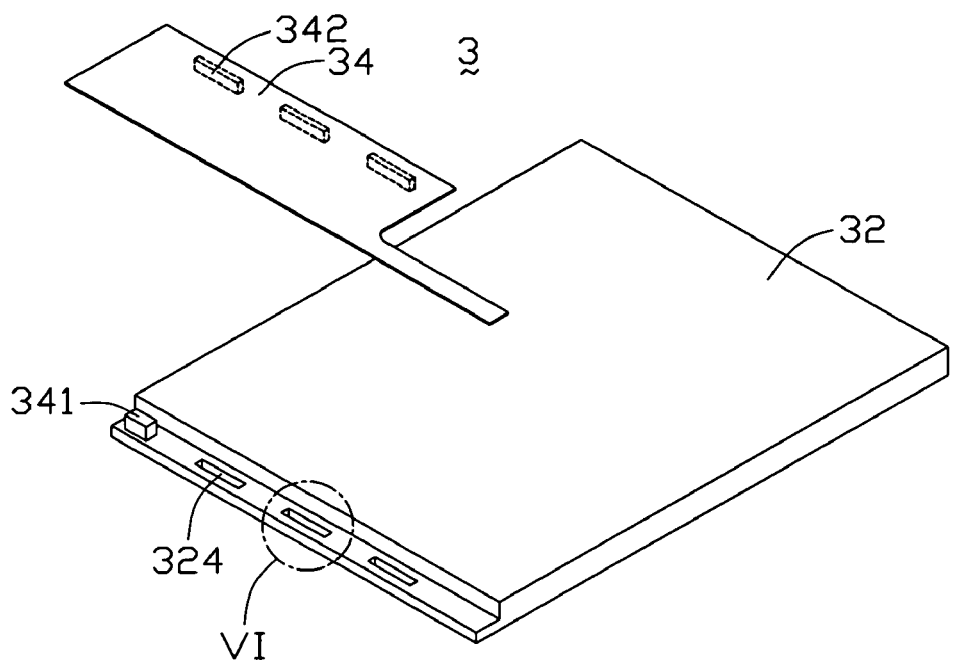
FIG. 5 is similar to FIG. 4, but showing the FPC detached from the liquid crystal panel.

Referring to FIGS. 4 and 5, a liquid crystal module 3 according to a second embodiment of the present invention includes a liquid crystal panel 32, an FPC 34, and a liquid crystal (LC) drive IC 341. An output end of the FPC 34 is electrically connected to a data region (not labeled) of the liquid crystal panel 32 by welding or by an ACF. The LC drive IC 341 is disposed on an end edge portion of the liquid crystal panel 32.

Figure 6:
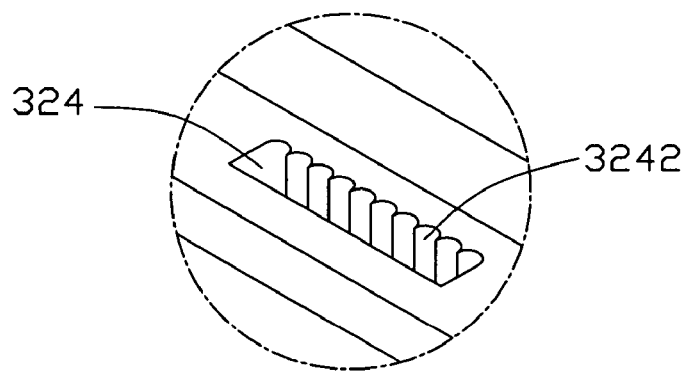
FIG. 6 is an enlarged view of a circled portion VI of FIG. 5.
Figure 7:
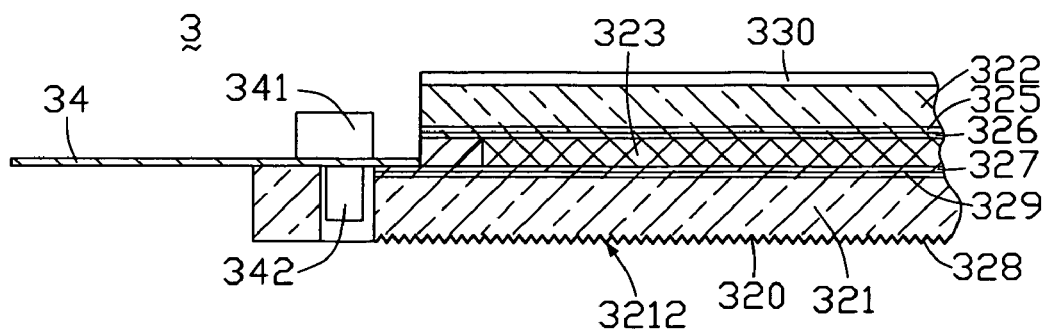
FIG. 7 is an enlarged, cross-sectional view of part of the liquid crystal module of FIG. 4, taken along line VII-VII thereof.

The FPC 34 has three LEDs 342 attached thereon and electrically connected thereto by surface mount technology (SMT). Referring also to FIGS. 6 and 7, a light guide plate 321 of the liquid crystal panel 32 defines a plurality of aligned slots 324 in a data region (not labeled) thereof, which data region corresponds to the data region of the liquid crystal panel 32. In the illustrated embodiment, the slots 324 are through slots 324. The slots 324 respectively correspond to the LEDs 342, and accommodate the LEDs 342 when the liquid crystal module 3 is assembled. Each slot 324 is bounded by an inmost wall that defines a plurality of vertical, parallel, continuously arranged U-shaped grooves 3242 therein. The wall having the grooves 3242 can diffuse light beams emitted from the corresponding LED 342.

Referring to FIG. 7, the liquid crystal panel 32 includes the light guide plate 321 having a thin film transistor (TFT) array (not shown) formed thereon, a glass substrate 322 having a color filter, and a liquid crystal layer 323 sandwiched between the light guide plate 321 and the glass substrate 322. The glass substrate 322 includes a common electrode 325 and an upper alignment layer 326 formed on an inner surface (not labeled) thereof in that order, and an upper polarizer 330 formed on an outer surface thereof. The light guide plate 321 includes an inner surface (not labeled) nearest to the liquid crystal layer 323, and an outer surface 3212 opposite to the inner surface. The light guide plate 321 has the array of TFTs (not shown), pixel electrodes (not shown), data lines (not shown), and gate lines (not shown) formed on the inner surface thereof. The light guide plate 321 further has a lower polarizer 329 and a lower alignment layer 327 formed in that order on the TFTs, the pixel electrodes, the data lines, and the gate lines. Polarizing axes of the upper and lower polarizers 330, 329 are perpendicular to each other. The outer surface 3212 defines a continuous jagged structure 320. A reflective film 328 is coated on the jagged structure 320. The LC drive IC 341 is attached on an edge portion of the inner surface of the light guide plate 321 having the lower polarizer 329 and the lower alignment layer 327 thereon by chip on glass (COG) technology. The LC drive IC 341 drives the liquid crystal panel 32.

Figure 8:
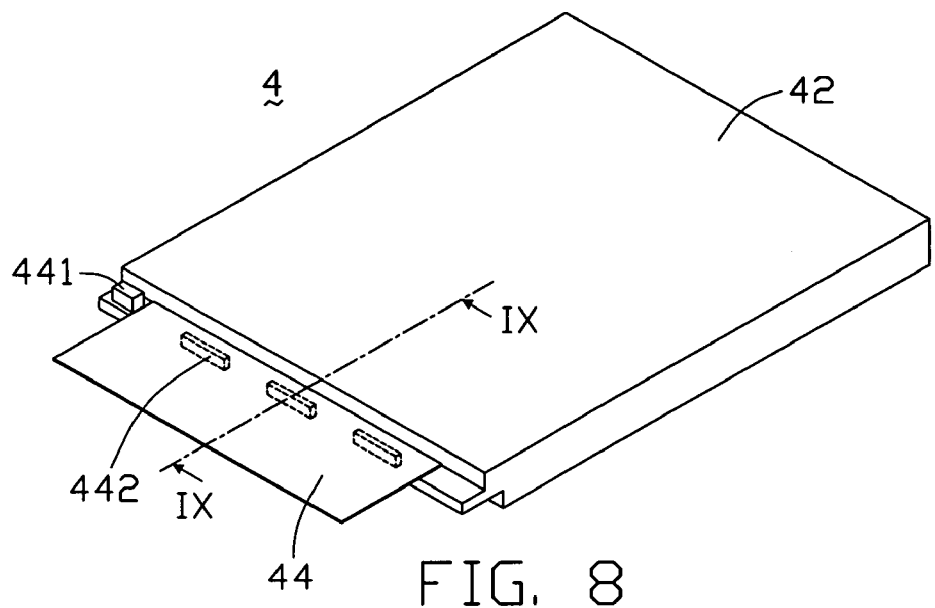
FIG. 8 is an isometric view of a liquid crystal module according to a third embodiment of the present invention, the liquid crystal module including a reflective film.

Referring to FIG. 8, a liquid crystal module 4 according to a third embodiment of the present invention includes a double-sided liquid crystal panel 42, and an FPC 44. An output end of the FPC 44 is electrically connected to a data region (not labeled) of the double-sided liquid crystal panel 42 by welding or by an anisotropic conductive film (ACF). Another end of the FPC 44 is electrically connected to a drive printed circuit board (PCB) (not shown). The drive PCB drives the double-sided liquid crystal panel 42 via the FPC 44. The FPC 44 has three LEDs 442 attached thereon and electrically connected thereto by surface mounting technology (SMT).

Figure 9:
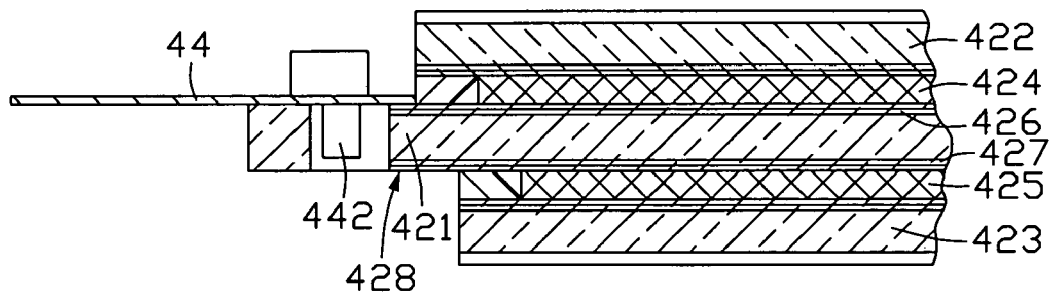
FIG. 9 is an enlarged, cross-sectional view of part of the liquid crystal module of FIG. 8, taken along line IX-IX thereof.

Referring also to FIG. 9, the double-sided liquid crystal panel 42 includes a transparent first substrate 422 for providing a main display, a transparent second substrate 423 for providing a secondary display, a light guide plate 421 between the first and second substrates 422, 423, a first liquid crystal layer 424 sandwiched between the first substrate 422 and the light guide plate 421, and a second liquid crystal layer 425 sandwiched between the light guide plate 421 and the second substrate 423. The light guide plate 421 has a first TFT array, first pixel electrodes (not shown), first data lines (not shown), and first gate lines (not shown) formed on an upper surface (not labeled) thereof, and a second TFT array, second pixel electrodes (not shown), second data lines (not shown), and second gate lines (not shown) formed on a main central portion of a lower surface (not labeled) thereof. The light guide plate 421 further has an upper polarizer 426 formed on the first TFTs, the first pixel electrodes, the first data lines, and the first gate lines; and a lower polarizer 427 formed on the second TFTs, the second pixel electrodes, the second data lines, and the second gate lines. A peripheral portion of the lower surface of the light guide plate 421 defines a jagged structure (not shown). The light guide plate 421 further includes a generally frame-shaped reflective film 428 formed on the jagged structure.

Figure 10:
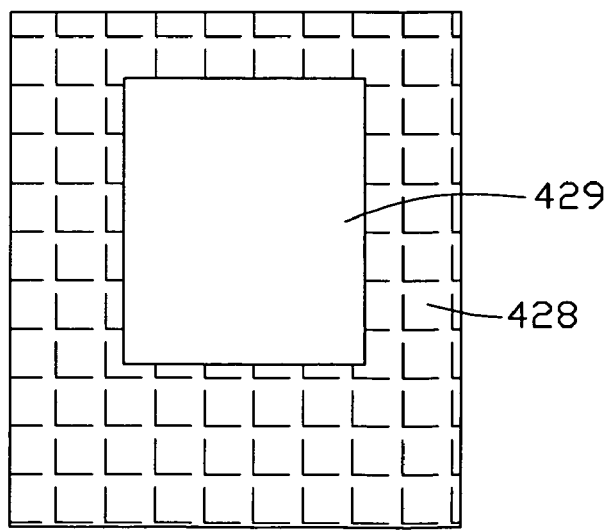
FIG. 10 is a bottom plan view of the reflective film of the liquid crystal module of FIG. 8, shown in isolation.
Figure 11:
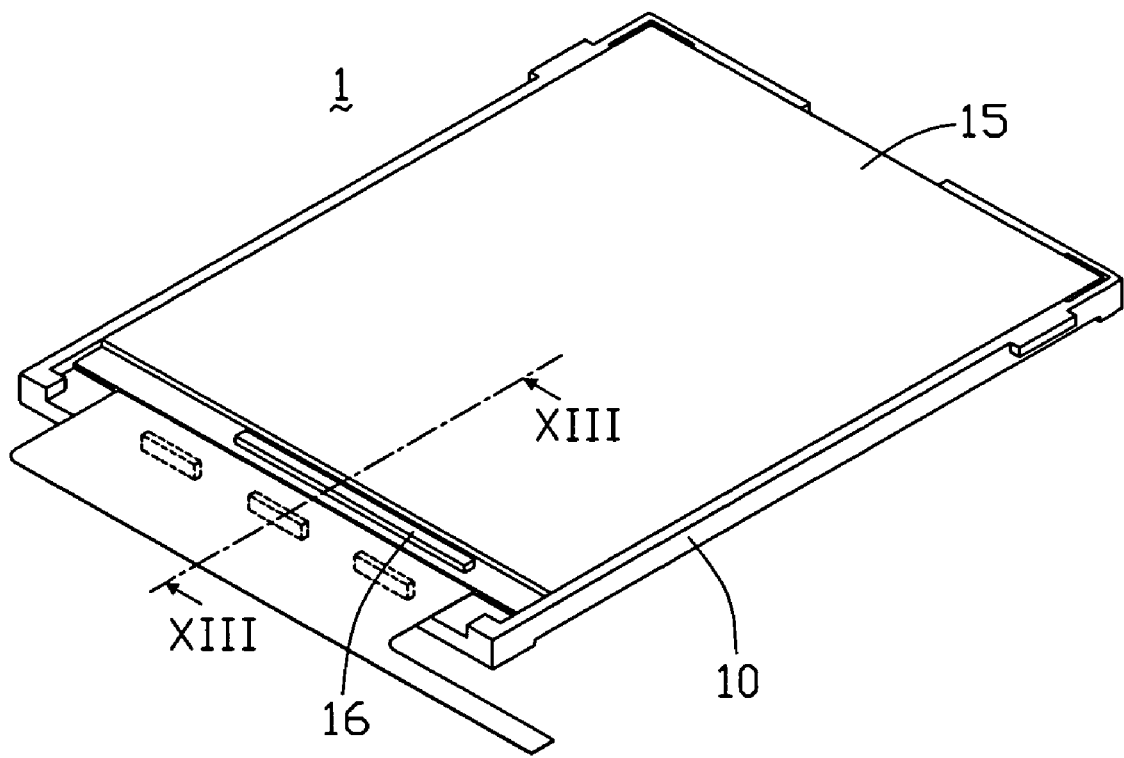
FIG. 11 is an isometric view of a conventional liquid crystal module.
Figure 12:
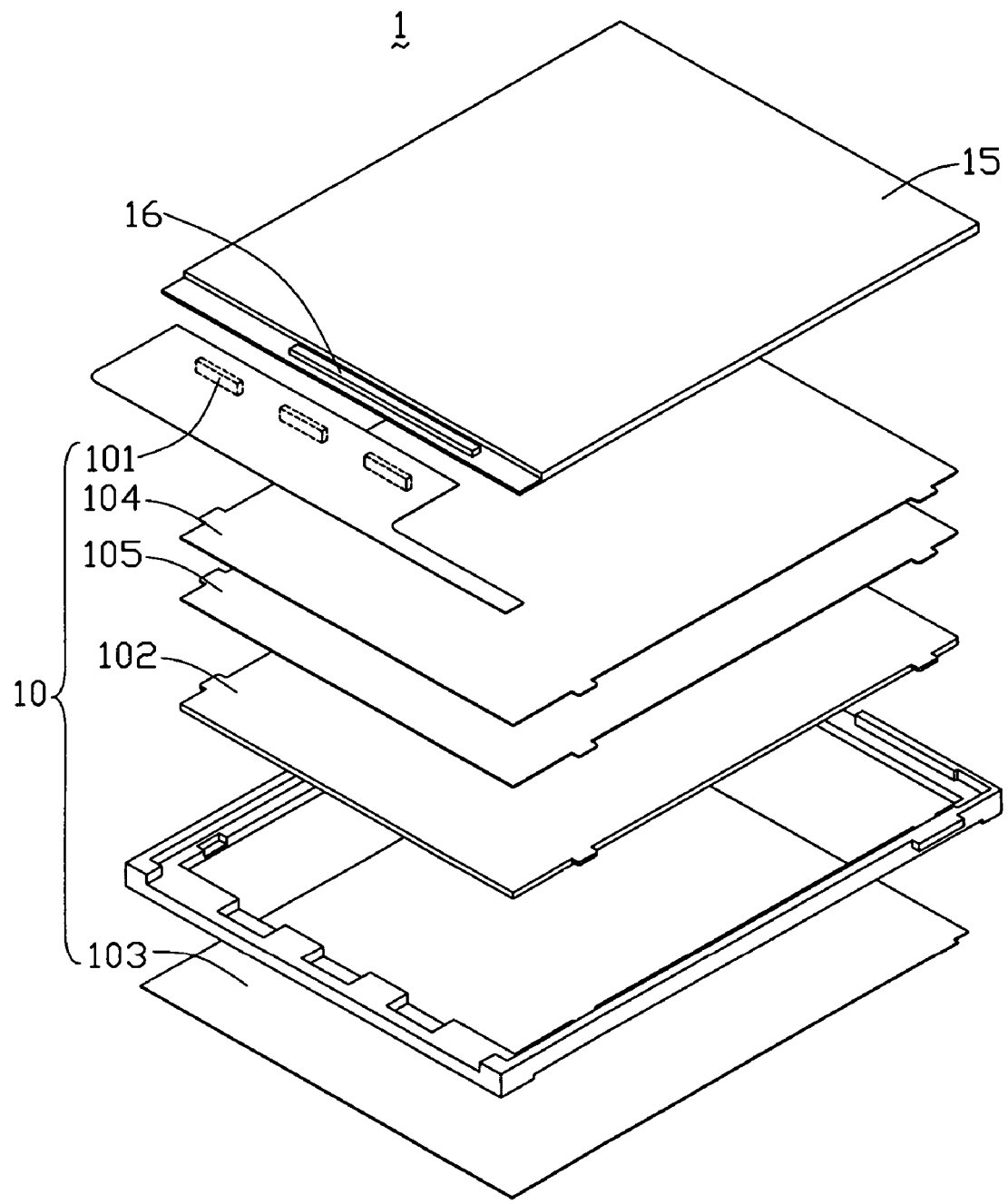
FIG. 12 is an exploded view of the liquid crystal module of FIG. 11.
Figure 13:
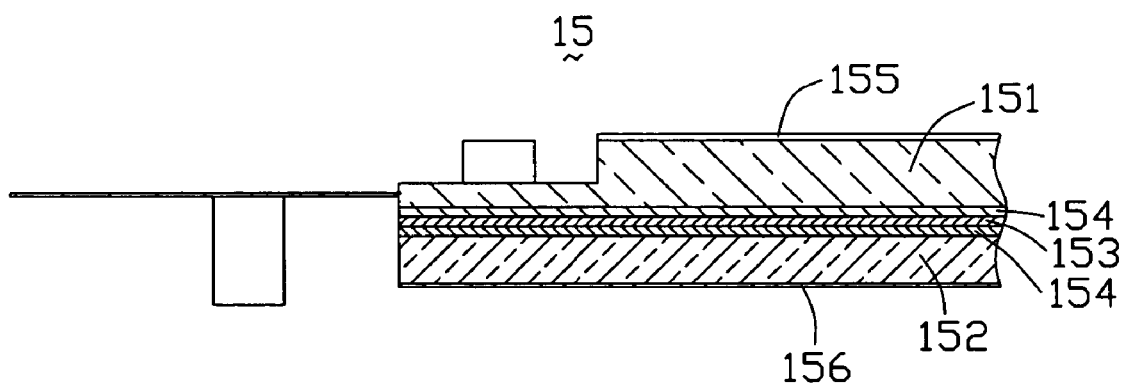
FIG. 13 is an enlarged, cross-sectional view of part of the liquid crystal module of FIG. 11, taken along line XIII-XIII thereof.

Referring also to FIG. 10, the reflective film 428 includes an opening 429 defined in a main central portion thereof. The opening 429 has an area substantially the same as that of the second substrate 423, so that a portion of light beams emitted from the LEDs 442 passes through the opening 429 to the second liquid crystal layer 425. Alternatively, the reflective film 428 can include a physical region in the main central portion thereof instead of having the opening 429. The physical region can be made from material having a lower reflectivity than that of a material of other portions of the reflective film 428.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal module comprising:
   a transparent substrate having a color filter;
   a light guide plate opposite to the transparent substrate, the light guide plate having a thin film transistor (TFT) array formed thereat; and
   a liquid crystal layer sandwiched between the transparent substrate and the light guide plate.

2. The liquid crystal module as claimed in claim 1, further comprising a flexible printed circuit (FPC) electrically connected to the TFT array of the light guide plate.

3. The liquid crystal module as claimed in claim 2, further comprising a light source adjacent to a side surface of the light guide plate, wherein the light source is electrically connected to the FPC.

4. The liquid crystal module as claimed in claim 3, wherein the light source is a light emitting diode (LED).

5. The liquid crystal module as claimed in claim 1, wherein the light guide plate comprises an outer surface distal from the transparent substrate, and the outer surface defines a jagged structure thereat.

6. The liquid crystal module as claimed in claim 5, further comprising a reflective film formed on the jagged structure of the light guide plate.

7. The liquid crystal module as claimed in claim 1, further comprising two alignment layers respectively disposed at inner surfaces of the transparent substrate and the light guide plate.

8. The liquid crystal module as claimed in claim 1, further comprising a first polarizer disposed at an outer surface of the transparent substrate, and a second polarizer disposed between the light guide plate and the liquid crystal layer.

9. The liquid crystal module as claimed in claim 2, further comprising a drive integrated circuit provided at the FPC.

10. The liquid crystal module as claimed in claim 1, further comprising a drive integrated circuit provided at the light guide plate.

11. The liquid crystal module as claimed in claim 2, further comprising a light source, wherein the light guide plate defines a slot accommodating the light source, and the light source is electrically connected to the FPC.

12. A liquid crystal module comprising:
    a transparent first substrate;
    a transparent second substrate;
    a light guide plate between the first and second substrates, the light guide plate comprising a first surface and a second surface opposite to the first surface;
    a first liquid crystal layer sandwiched between the first substrate and the light guide plate; and
    a second liquid crystal layer sandwiched between the second substrate and the light guide plate;
    wherein the light guide plate has a thin film transistor (TFT) array formed at the first surface thereof, and a TFT array formed at the second surface thereof.

13. The liquid crystal module as claimed in claim 12, wherein a peripheral portion of the second surface of the light guide plate defines a jagged structure.

14. The liquid crystal module as claimed in claim 13, further comprising a reflective film formed on the jagged structure of the light guide plate.

15. The liquid crystal module as claimed in claim 12, further comprising a flexible printed circuit (FPC) electrically connected to the TFT arrays of the light guide plate.

16. The liquid crystal module as claimed in claim 15, further comprising a light source adjacent to a side surface of the light guide plate, wherein the light source is electrically connected to the FPC.

17. The liquid crystal module as claimed in claim 16, wherein the light source is a light emitting diode (LED).

* * * * *